United States Patent Office.

GEORGE B. SMITH, OF DETROIT, MICHIGAN, ASSIGNOR TO HENRY A. RICHARDSON, OF BROOKLYN, NEW YORK.

COMPOSITION FOR TREATING IRON, STONE, &c.

SPECIFICATION forming part of Letters Patent No. 450,388, dated April 14, 1891.

Application filed December 10, 1890. Serial No. 374,150. (No specimens.)

*To all whom it may concern:*

Be it known that I, GEORGE B. SMITH, a citizen of the United States, and a resident of Detroit, in the county of Wayne, State of Michigan, have invented a new and useful Composition for Treating Iron, Stone, and other Material, of which the following is a full and complete specification.

The object of my improved composition is to prevent the oxidation or corrosion of the substance treated and render the same waterproof and unchangeable from exposure to water and moisture.

My improvement consists of a liquid composition, which is brushed or washed over the surface of the iron, stone, brick, or other substance which it is desired to protect, and which, by reason of its inherent properties, penetrates or is absorbed by the pores of the iron or other material, thus filling up all the pores near the surface and forming a coating over the surface, which prevents rusting or corrosion and disintegration and renders the substance waterproof.

My improved composition consists in its simplest form of a solution of resin and wax in benzine and fusel-oil, (amylic alcohol,) to which may be added linseed-oil. The wax used may be ordinary beeswax, mineral wax, (ozocerite,) or paraffine-wax, or may be a mixture of any two, or, as I prefer, of all three of the above varieties of wax. If desired, any suitable drier may be added to the composition.

In manufacturing my improved composition I proceed as follows: To form about one hundred and seventy gallons of the solution I take four hundred pounds of rosin, thirty pounds of ozocerite (mineral wax,) thirty pounds of paraffine-wax, and fifteen pounds of beeswax. If a drier is desired, I add to the above five pounds of borate of manganese. The above ingredients are placed in any suitable vessel and heated for about one hour, until thoroughly melted and mixed together. I then take about fifty (50) gallons of the melted mixture of wax and rosin while hot, and place them in a tank containing one hundred gallons of benzine. I then add ten gallons of fusel-oil (amylic alcohol) and ten gallons of linseed-oil, when the mixture is ready for use.

The above process may be varied, as the rosin and wax may be placed in the benzine while cold without previous melting and allowed to dissolve in the latter, and when entirely dissolved the fusel-oil and linseed-oil may be added to the solution, and the proportions of the various ingredients may be changed, as is found desirable, and to adapt the composition for use on metal, stone, and different substances.

Any coloring-matter may be added to the above composition when it is desired to color the surface of the material treated. In this form the composition becomes a paint, or the composition may be mixed with any ordinary paint in place of the usual oil. When thus used as a paint, the composition not only colors the surface as an ordinary paint, but protects it and prevents any rust or corrosion.

My improved composition is adapted for use on any metal, as the various forms of iron, or on stone, brick, plaster, wood, or any porous material, and as it is applied cold and without any previous treatment of the surface to be covered it in no wise injures the most delicate substance, and when used in its simplest form without coloring-matter it does not change or alter the color of the material on which it is placed.

It is understood that the benzine performs the function of a solvent of the rosin and wax, and that this solution being mixed with the fusel-oil is carried into the pores of the body to which it is applied by the fusel-oil acting as a vehicle for that purpose.

What I claim is—

1. A liquid composition consisting of fusel-oil and a solution of rosin and wax in benzine, substantially as described.

2. A liquid composition consisting of fusel-oil and linseed-oil and a solution of rosin and wax in benzine, substantially as described.

3. A liquid composition consisting of fusel-oil and a solution of rosin and wax, substantially as described.

4. A water-proof composition composed of fusel-oil and linseed-oil and rosin, wax, and a drier dissolved in benzine, substantially as described.

5. A water-proof composition composed of fusel-oil and linseed-oil and rosin, ozocerite, paraffine-wax, beeswax, and borate of manganese dissolved in benzine, substantially as described.

6. A water-proof paint composed of fusel-oil and a solution of wax and rosin mixed with the usual coloring-matter, substantially as described.

GEORGE B. SMITH.

Witnesses:
JAMES T. LAW,
J. E. GREER.